United States Patent
Hunter, Jr. et al.

(10) Patent No.: US 6,349,538 B1
(45) Date of Patent: Feb. 26, 2002

(54) ANNULAR LIQUID FUELED PULSE DETONATION ENGINE

(75) Inventors: Louis G. Hunter, Jr.; Kent W. Benner, both of Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/593,068

(22) Filed: Jun. 13, 2000

(51) Int. Cl.[7] .................................................. F02K 7/06
(52) U.S. Cl. .......................................... 60/204; 60/247
(58) Field of Search .......................... 60/204, 247, 248, 60/39.76, 39.78, 39.79, 39.8

(56) References Cited

U.S. PATENT DOCUMENTS

| | | | | |
|---|---|---|---|---|
| 2,948,113 A | * | 8/1960 | Miller ........................... | 60/247 |
| 5,280,705 A | * | 1/1994 | Epstein et al. ................. | 60/247 |
| 5,345,758 A | | 9/1994 | Bussing ....................... | 60/39.38 |
| 5,353,588 A | | 10/1994 | Richard ....................... | 60/39.38 |
| 5,473,885 A | | 12/1995 | Hunter, Jr. et al. ........... | 60/204 |
| 5,513,489 A | | 5/1996 | Bussing ....................... | 60/39.38 |
| 5,546,744 A | | 8/1996 | Winfree et al. ................ | 60/247 |
| 5,557,926 A | | 9/1996 | Hunter, Jr. et al. ........... | 60/247 |
| 5,579,633 A | | 12/1996 | Hunter, Jr. et al. ........... | 60/204 |
| 5,615,548 A | | 4/1997 | Winfree et al. ............. | 60/39.78 |
| 5,672,184 A | | 9/1997 | Hunter, Jr. ..................... | 48/77 |
| 5,855,827 A | | 1/1999 | Bussing et al. ................. | 264/7 |
| 5,864,517 A | | 1/1999 | Hinkey et al. ............... | 367/145 |
| 5,873,240 A | | 2/1999 | Bussing et al. ............... | 60/207 |
| 5,901,550 A | | 5/1999 | Bussing et al. ............ | 60/39.38 |
| 5,937,635 A | | 8/1999 | Winfree et al. ............ | 60/39.38 |
| 6,003,301 A | | 12/1999 | Bratkovich et al. ........... | 60/204 |

* cited by examiner

*Primary Examiner*—Michael Koczo
(74) *Attorney, Agent, or Firm*—Bracewell & Patterson, L.L.P.

(57) ABSTRACT

A pulse detonation engine has an inner tubular housing rigidly and concentrically mounted within a cylindrical bore of an outer tubular housing. The inner housing has a plurality of inner housing ports, and the outer housing has a plurality of outer housing ports. A detonation chamber is formed in the annulus between the inner housing and the outer housing. In one embodiment, an outer valve sleeve is rotatably mounted to the outer housing for selectively allowing air to enter the detonation chamber through the outer housing ports. A movable, inner protective sleeve is mounted to the inner housing for protecting a plurality of fuel injectors that supply liquid fuel to the detonation chamber through the inner housing ports. The air and liquid fuel mixture is detonated by several igniters located in the detonation chamber. In a second embodiment, an inner valve sleeve is rotatably mounted to the inner housing for selectively allowing air to enter the detonation chamber through the inner housing ports. A movable, outer protective sleeve is mounted to the outer housing for protecting a plurality of fuel injectors that supply liquid fuel to the detonation chamber through the outer housing ports. The air and liquid fuel mixture is detonated by several igniters located in the detonation chamber. The detonation for both embodiments creates a detonation wave that travels through an open downstream end of the detonation chamber, thereby creating thrust for the engine.

20 Claims, 5 Drawing Sheets

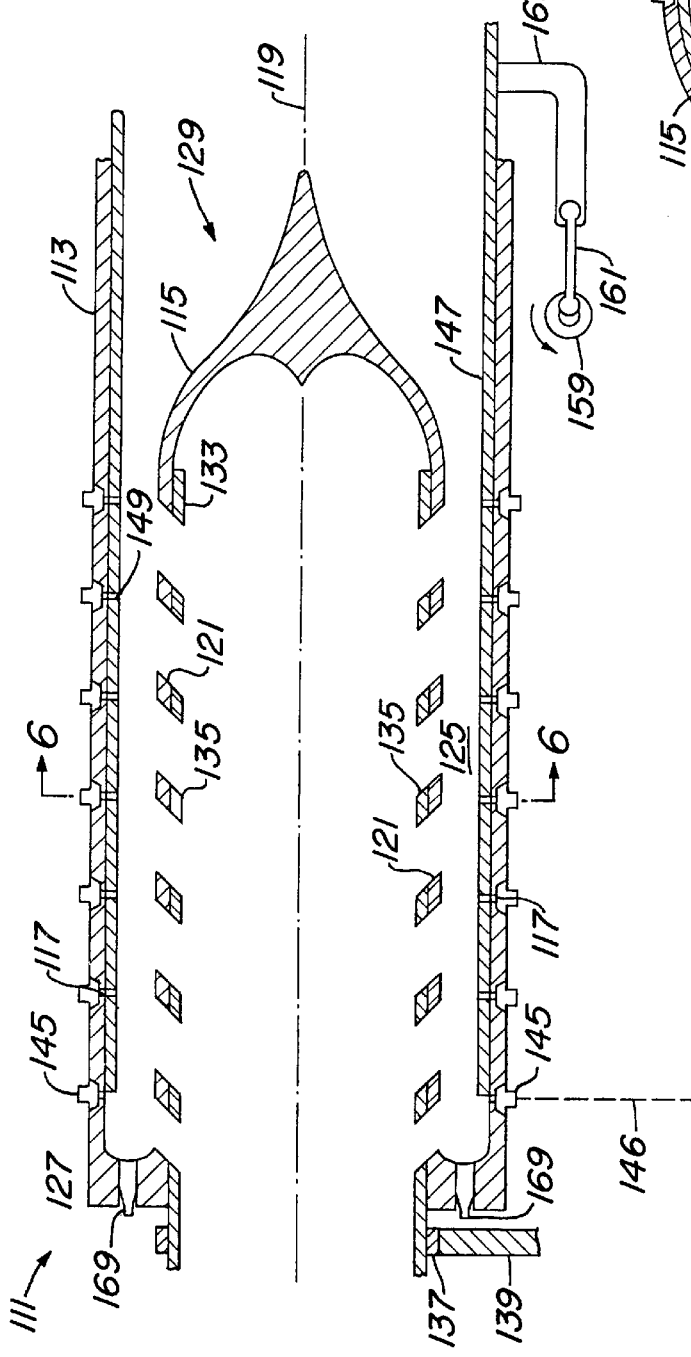

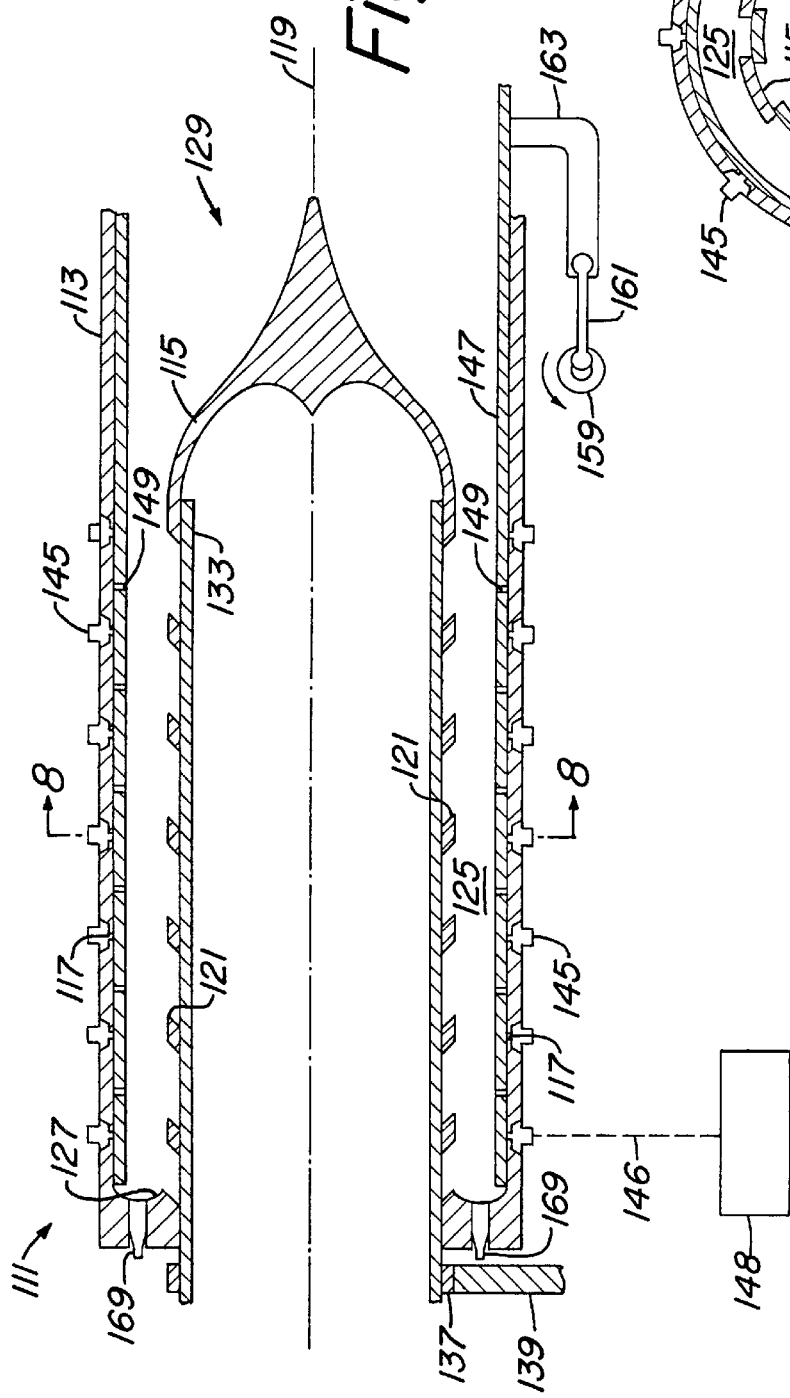
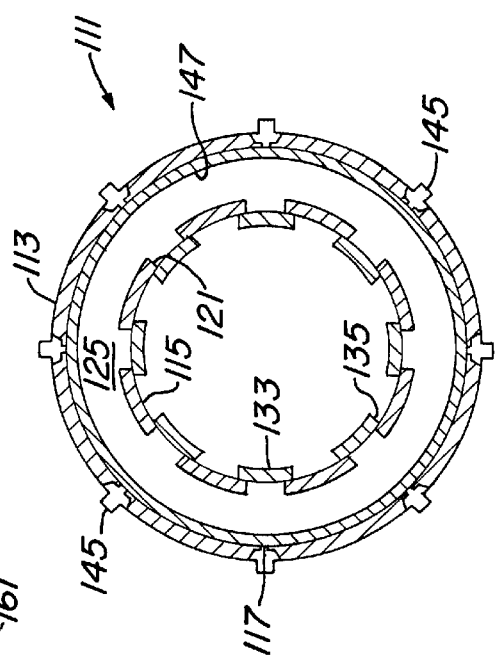

ANNULAR LIQUID FUELED PULSE DETONATION ENGINE

BACKGROUND OF THE INVENTION

1. Field of the Invention

This invention relates in general to engines and in particular to intermittent detonation engines fueled by a liquid fuel in which the detonation products are used as the thrust producing medium.

2. Description of Related Art

A pulse detonation engine is an apparatus which produces a high pressure exhaust from a series of repetitive detonations within a detonation chamber. A fuel is detonated within the chamber, causing a wave which propagates at supersonic speeds. The speeds could approach or exceed Chapman Jouguet detonation velocities. The wave compresses the fluid within the chamber, increasing its pressure, density, and temperature. As the wave passes out an open rearward end of the detonation chamber, thrust is created. The cycle is then repeated.

At high speeds, such as Mach 2 to about Mach 3.5, such an engine would be theoretically more efficient than conventional turbojets because the engine does not require compressors or turbines. A pulse detonation engine supplying the same amount or more of thrust as a conventional gas turbine engine would theoretically weigh less. Also, a pulse detonation engine could be used as a propulsion system for a rocket.

Typically, pulse detonation engines have been described as gaseous fueled engines. Most aircraft today are fueled by liquid hydrocarbons such as JP-4, JP-5, or JP-10. Significant infrastructures are installed on these aircraft to store and deliver the liquid fuel to the aircraft's power source. Because of this, it highly desirous to have a pulse detonation engine that is fueled by liquid fuel and that can be easily integrated for use on an existing aircraft that uses liquid fuel.

BRIEF SUMMARY OF THE INVENTION

The pulse detonation engine of the present invention solves the main problem associated with integrating a pulse detonation engine with an existing aircraft. Since the pulse detonation engine of the present invention uses liquid fuel as a propellant, the engine can be easily integrated with an existing aircraft design, using the traditional liquid fuel infrastructure of the existing aircraft.

In a first embodiment of the present invention, a pulse detonation engine includes an outer tubular housing having a cylindrical bore and a plurality of outer housing ports. An inner tubular housing having a cylindrical bore and plurality of inner housing ports is rigidly and concentrically connected within the outer tubular housing. A detonation chamber is formed in the annulus between the inner and outer housings, the detonation chamber having an upstream end wall and an open downstream end.

An outer valve sleeve having a plurality of outer sleeve ports is concentrically and rotatably mounted to an exterior of the outer housing, the outer sleeve ports aligning with the outer housing ports when the outer valve sleeve is in an open position and not aligning with the outer housing ports when the outer valve sleeve is in a closed position.

A plurality of fuel injectors for injecting liquid fuel into the detonation chamber are rigidly disposed in the inner tubular housing, each fuel injector aligning with one of the inner housing ports. An inner protective sleeve having a plurality of inner sleeve ports is concentrically carried on an exterior of the inner housing. The inner protective sleeve oscillates along a longitudinal axis of the inner tubular housing between an open position and a closed position, the inner sleeve ports aligning with the inner housing ports when the inner protective sleeve is in the open position and not aligning with the inner housing ports when the inner protective sleeve is in the closed position.

An external drive system is used to rotate the outer valve sleeve and oscillate the inner protective sleeve. As the outer valve sleeve opens, air enters the detonation chamber through the outer housing ports. At the same time, the inner protective sleeve opens, and the fuel injectors inject liquid fuel into the detonation chamber through the inner housing ports. The liquid fuel and air form a fuel mixture, which is detonated by igniters that are disposed in the upstream end wall. The resulting detonation wave discharges out of the open downstream end of the detonation chamber, creating thrust for the engine.

In a second embodiment, a pulse detonation engine includes an outer tubular housing having a cylindrical bore and a plurality of outer housing ports. An inner tubular housing having a cylindrical bore and plurality of inner housing ports is rigidly and concentrically connected within the outer tubular housing. A detonation chamber is formed in the annulus between the inner and outer housings, the detonation chamber having an upstream end wall and an open downstream end.

An inner valve sleeve having a plurality of inner sleeve ports is concentrically and rotatably mounted to an interior of the inner housing, the inner sleeve ports aligning with the inner housing ports when the inner valve sleeve is in an open position and not aligning with the inner housing ports when the inner valve sleeve is in a closed position.

A plurality of fuel injectors for injecting liquid fuel into the detonation chamber are rigidly disposed on the outer tubular housing, each fuel injector aligning with one of the outer housing ports. An outer protective sleeve having a plurality of outer sleeve ports is concentrically mounted to an interior of the outer housing. The outer protective sleeve oscillates along a longitudinal axis of the outer tubular housing between an open position and a closed position, the outer sleeve ports aligning with the outer housing ports when the outer protective sleeve is in the open position and not aligning with the outer housing ports when the outer protective sleeve is in the closed position.

An external drive system is used to rotate the inner valve sleeve and oscillate the outer protective sleeve. As the inner valve sleeve opens, air enters the detonation chamber through the inner housing ports. At the same time, the outer protective sleeve opens, and the fuel injectors inject liquid fuel into the detonation chamber through the outer housing ports. The liquid fuel and air form a fuel mixture, which is detonated by igniters that are disposed in the upstream end wall. The resulting detonation wave discharges out of the open downstream end of the detonation chamber, creating thrust for the engine.

BRIEF DESCRIPTION OF THE DRAWINGS

FIG. 5 is a cross-sectional side view of an alternate embodiment of a liquid fueled pulse detonation engine having inner and outer sleeves according to the present invention, the inner and outer sleeves being shown in an open position.

FIG. 6 is a cross-sectional front view of the pulse detonation engine of FIG. 5 taken along line VI—VI.

FIG. 7 is a cross-sectional side view of the pulse detonation engine of FIG. 5, the inner and outer sleeves being shown in a closed position.

FIG. 8 is a cross-sectional front view of the pulse detonation engine of FIG. 7 taken along line VIII—VIII.

DETAILED DESCRIPTION OF THE PREFERRED EMBODIMENT

Figure 1:
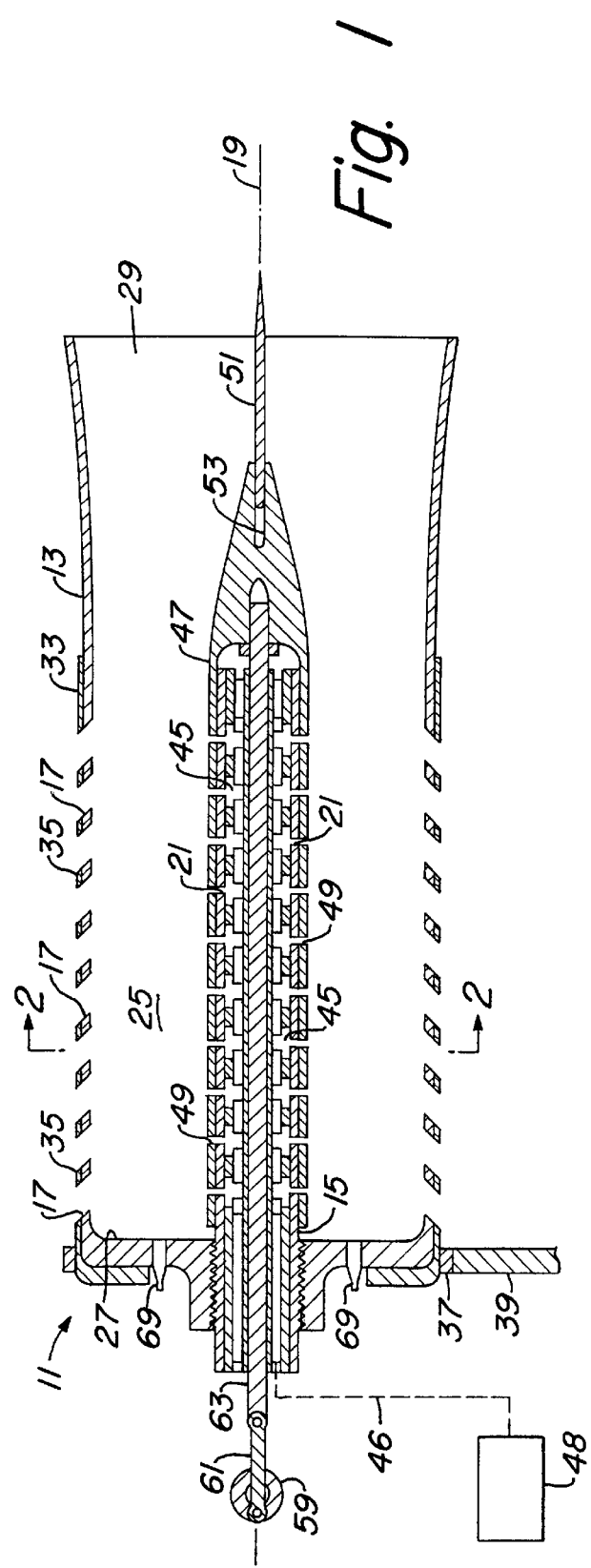
FIG. 1 is a cross-sectional side view of a first embodiment of a liquid fueled pulse detonation engine having inner and outer sleeves according to the present invention, the inner and outer sleeves being shown in an open position.

Referring to FIGS. 1–4 in the drawings, the preferred embodiment of a pulse detonation engine 11 according to the present invention is illustrated. Pulse detonation engine 11 includes an outer tubular housing 13 and an inner tubular housing 15. Outer tubular housing 13 has a plurality of outer housing ports 17 and a cylindrical bore with a longitudinal axis 19. Inner tubular housing 15 is rigidly connected to outer tubular housing 13 within the bore, concentric with longitudinal axis 19. Inner tubular housing 15 includes a plurality of inner housing ports 21 and a cylindrical bore with a longitudinal axis coaxial to axis 19.

The location of inner tubular housing 15 within the bore of outer tubular housing 13 forms an annular detonation chamber 25. The detonation chamber 25 has an upstream end wall 27 that is an integral part of outer tubular housing 13. The detonation chamber has an open downstream end 29.

An outer valve sleeve 33 is concentrically and rotatably mounted on an exterior of the outer tubular housing 13. Outer valve sleeve 33 includes a plurality of outer sleeve ports 35 for registering with the outer housing ports 17 when valve sleeve 33 is in an open position (see FIG. 1). A driven gear 37 is circumferentially disposed on an exterior of the valve sleeve 33 for receiving a drive gear 39. The drive gear 39 is rotated by an external drive source to rotate outer valve sleeve 33 relative to outer tubular housing 13.

The plurality of outer sleeve ports 35 and outer housing ports 17 allow air and/or oxygen to enter the detonation chamber 25 during operation of pulse detonation engine 11. In some instances, air may be used as the sole oxidizing agent. In other instances, pure oxygen or oxygen-rich air may be injected into detonation chamber 25 through outer housing ports 17 nearer to upstream end wall 27. A higher concentration of oxygen near the upstream end wall 27, which is where ignition takes place, can aid in the ignition of a fuel mixture.

Figure 2:
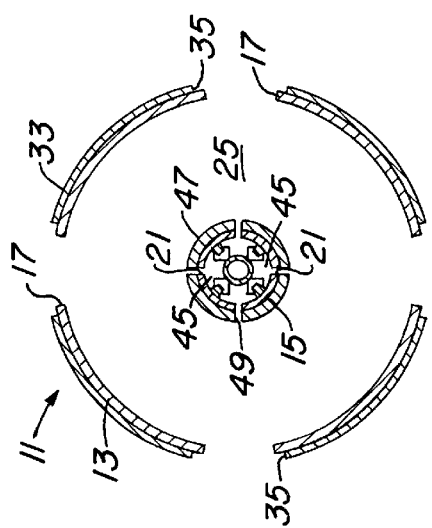
FIG. 2 is a cross-sectional front view of the pulse detonation engine of FIG. 1 taken along line II—II.
Figures 3, 4:
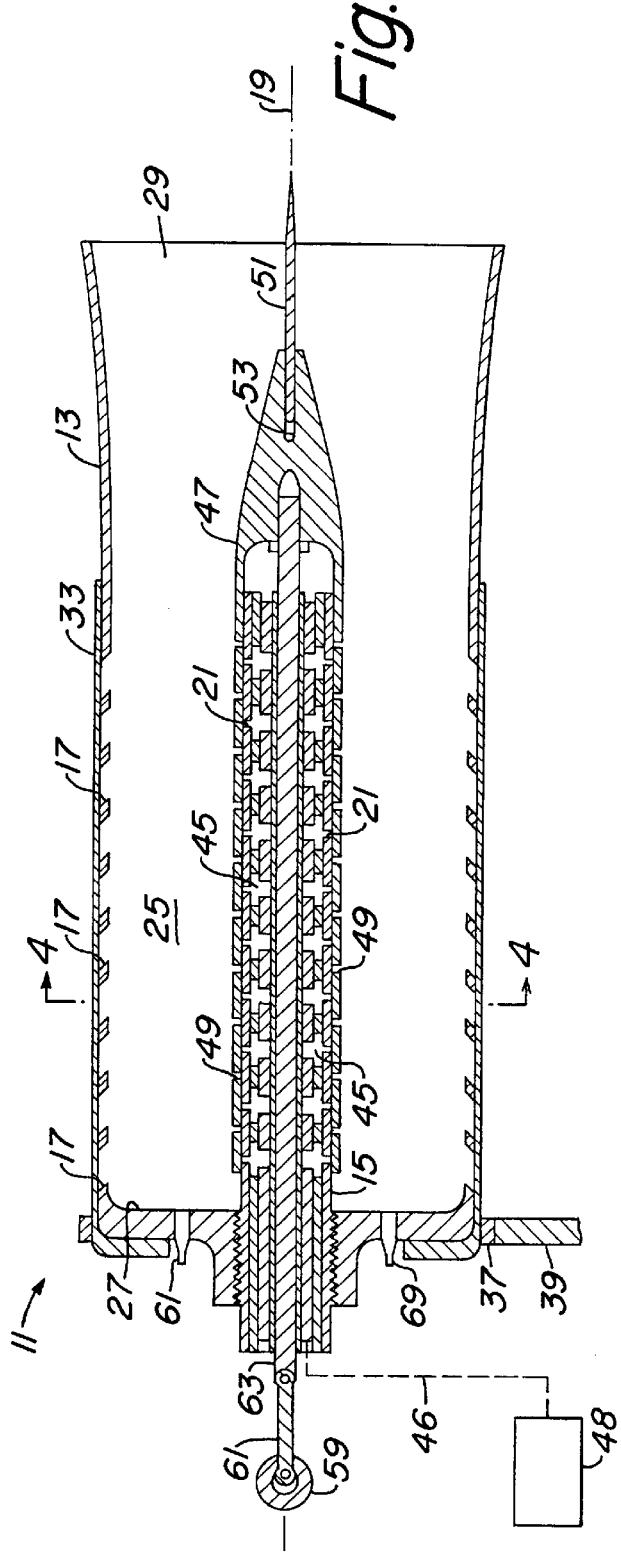
FIG. 3 is a cross-sectional side view of the pulse detonation engine of FIG. 1, the inner and outer sleeves being shown in a closed position.
FIG. 4 is a cross-sectional front view of the pulse detonation engine of FIG. 3 taken along line IV—IV.

Outer sleeve ports 35 and outer housing ports 17 are arranged in four axial groups, each group being circumferentially disposed 90 degrees apart from the adjacent groups (see FIGS. 2 and 4). The outer sleeve ports 35 and the outer housing ports 17 are angled toward the upstream end wall 27. The angled characteristic of each port 17, 35 boosts the air or oxygen delivery to the detonation chamber 25, especially when using ram air that flows past the exterior of outer tubular housing 13.

A plurality of fuel injectors 45 are rigidly connected to the inner tubular housing 15 within the bore of the housing 15. Each fuel injector 45 is aligned with one of the inner housing ports 21 to provide liquid fuel to the detonation chamber 25. Fuel injectors 45 atomize liquid fuel to approximately four microns and deliver the fuel to detonation chamber 25. The atomized liquid fuel is mixed in the detonation chamber 25 with air or oxygen that enters through the outer housing ports 17 to create a fuel mixture. Lines 46 (schematically shown) lead from a fuel tank source 48 to each fuel injector 45.

An inner protective sleeve 47 is concentrically disposed on an exterior of the inner tubular housing 15 and is capable of translational movement along longitudinal axis 19 relative to inner tubular housing 15. Inner protective sleeve 47 includes a plurality of inner sleeve ports 49 for registering with the inner housing ports 21. The primary function of inner protective sleeve 47 is protection of the fuel injectors 45 during detonation. It is conceivable that inner protective sleeve 47 could have a valving function such as that provided by outer valve sleeve 33, but when used with fuel injectors 45, such a valving function is unnecessary.

The plurality of inner sleeve ports 49 and inner housing ports 21 allow fuel to enter the detonation chamber 25 during operation of pulse detonation engine 11. Inner sleeve ports 49 and inner housing ports 21 are arranged in four axial groups, each group being circumferentially disposed 90 degrees apart from the adjacent groups. Each group of the inner housing ports 21 is radially aligned with each group of outer housing ports 17 (see FIG. 2). The radial alignment of these ports 17, 21 allows improved mixing of the liquid fuel and air as it enters the detonation chamber 25.

A cylindrical guide member 51 is rigidly connected to the outer tubular housing 13 near open downstream end 29, the guide member being concentric with longitudinal axis 19. Inner protective sleeve 47 has a channel 53 located at one end for receiving guide member 51.

Guide member 51 serves to guide the inner protective sleeve 47 during its translational movement between an open position (see FIGS. 1 and 2) and a closed position (see FIGS. 3 and 4). In the open position, the inner sleeve ports 49 register with the inner housing ports 21, thereby exposing the fuel injectors 45 and allowing fluid communication between the fuel injectors 45 and the detonation chamber 25. In the closed position, the inner sleeve ports 49 no longer register with the inner housing ports 21. When the inner sleeve 47 is closed, the sleeve 47 covers the fuel injectors 45 thus protecting them during detonation.

Inner protective sleeve 47 is oscillated by an external drive system. The external drive system, which may or may not be the same as that used with the outer valve sleeve 33, is operably connected to a crank shaft 59. A connecting rod 61 is connected to the crank shaft 59 and converts the rotational motion of the crank shaft 59 to translational motion along longitudinal axis 19. A translation rod 63 is rigidly connected at one end to the connecting rod 61 and at another end to the inner protective sleeve 47. The translation rod 63 passes through the bore of inner tubular housing 15. As the crank shaft 59 is rotated by the external drive system, the translation rod 63 and the inner protective sleeve 47 oscillate along longitudinal axis 19 between the open position and the closed position.

Detonation of the fuel mixture is performed by igniters 69, which may be either spark-type or lasers. At least two igniters 69 are disposed in the upstream end wall 27 of the detonation chamber 25. It is preferred to have at least four igniters 69 in the detonation chamber 25, each igniter spaced 90 degrees apart. Only two of the four igniters 69 are shown in FIGS. 1 and 3. An alternate method of detonation could be supplied by injecting a preliminary detonation wave to start the main detonation.

In operation, the movements of outer valve sleeve 33 and inner protective sleeve 47 are timed to operate synchronously with fuel injectors 45. During a normal cycle of the engine, the outer valve sleeve 33 opens, thus aligning outer sleeve ports 35 with outer housing ports 17. At the same time, the inner protective sleeve 47 opens, thus aligning inner sleeve ports 49 with inner housing ports 21. Air enters the detonation chamber 25 through outer housing ports 17 as atomized liquid fuel is delivered by the fuel injectors 45 through inner housing ports 21. As the air and fuel enter the detonation chamber, the fuel mixture is formed.

Outer valve sleeve 33 closes so that outer sleeve ports 35 and outer housing ports 17 are no longer aligned. At the same time, the inner protective sleeve 47 moves along axis 19 into the closed position, thereby covering the fuel injectors 45. The fuel mixture is detonated by igniters 69. As the fuel mixture detonates, a detonation wave is formed that moves at five to seven thousand feet per second relative to the stationary reactants in front of the wave. The detonation wave is a high temperature, high pressure, detonation wave which discharges out open downstream end 29, creating thrust. A reverberating expansion wave is created by the initial detonation wave. The expansion wave reflects off the upstream end wall 27 and discharges from the open downstream end 29, creating additional thrust. The closure of outer valve sleeve 33 and inner protective sleeve 47 prevents hot products and hot metal from coming into contact with fuel or oxygen that has not yet been introduced into the detonation chamber 25.

After detonation, the outer valve sleeve 33 moves again into the open position. During this portion of the cycle, however, no fuel is injected. Instead, ram air is allowed to flow through the outer housing ports 17 into the detonation chamber 25. The ram air purges the detonation chamber 25 of any hot products and dilutes any trapped reactants. Immediately after purging, the outer valve sleeve 33 closes, and then the entire cycle is repeated. The rotational speed of outer valve sleeve 33, the translational speed of inner protective sleeve 47, and the injection rate of fuel injectors 45 are selected to create pulses at a rate of approximately 100 cycles per second.

Referring to FIGS. 5–8 in the drawings, an alternate embodiment of a pulse detonation engine 111 according to the present invention is illustrated. Pulse detonation engine 111 includes an outer tubular housing 113 and an inner tubular housing 115. Outer tubular housing 113 has a plurality of outer housing ports 117 and a cylindrical bore with a longitudinal axis 119. Inner tubular housing 115 is rigidly connected to outer tubular housing 113 within the bore, concentric with longitudinal axis 119. Inner tubular housing 115 includes a plurality of inner housing ports 121 and a cylindrical bore.

The location of inner tubular housing 15 within the bore of outer tubular housing 113 forms an annular detonation chamber 125. The detonation chamber 125 has an upstream end wall 127 that is an integral part of outer tubular housing 113. The detonation chamber has an open downstream end 129.

An inner valve sleeve 133 is concentrically and rotatably mounted on an interior of the inner tubular housing 115. Inner valve sleeve 133 includes a plurality of inner sleeve ports 135 for registering with the inner housing ports 121 when valve sleeve 133 is in an open position (see FIG. 5).

A driven gear 137 is circumferentially disposed on an exterior of the valve sleeve 133 for receiving a drive gear 139. The drive gear 139 is rotated by an external drive source to rotate inner valve sleeve 133 relative to inner tubular housing 115.

The plurality of inner sleeve ports 135 and inner housing ports 121 allow air or oxygen to enter the detonation chamber 125 during operation of pulse detonation engine 111. In some instances, air may be used as the sole oxidizing agent. In other instances, pure oxygen or oxygen-rich air may be injected into detonation chamber 125 through inner housing ports 121 nearer to upstream end wall 127. A higher concentration of oxygen near the upstream end wall 127, which is where ignition takes place, can aid in the ignition of a fuel mixture.

Inner sleeve ports 135 and inner housing ports 121 are arranged in eight axial groups, each group being circumferentially disposed 45 degrees apart from the adjacent groups. It should be noted, however, that a smaller number of axial groups could be used. The inner sleeve ports 135 and the inner housing ports 121 are angled away from the upstream end wall 127. The angled characteristic of each port 121, 135 boosts the air or oxygen delivery to the detonation chamber 125, especially when using ram air that flows into an interior of inner tubular housing 115.

A plurality of fuel injectors 145 are rigidly connected to the outer tubular housing 113 and are aligned with the outer housing ports 117 to provide liquid fuel to the detonation chamber 125. Lines 146 supply fuel to the fuel injectors 145 from a fuel source 148. Fuel injectors 145 atomize liquid fuel to approximately four microns and deliver the fuel to detonation chamber 125. The atomized liquid fuel is mixed in the detonation chamber 125 with air or oxygen that enters through the inner housing ports 121 to create a fuel mixture.

An outer protective sleeve 147 is concentrically disposed on an interior of the outer tubular housing 113 and is capable of translational movement along longitudinal axis 119 relative to outer tubular housing 113. Outer protective sleeve 147 includes a plurality of outer sleeve ports 135 for registering with the outer housing ports 117. The primary function of outer protective sleeve 147 is protection of the fuel injectors 145 during detonation. It is conceivable that outer protective sleeve 147 could have a valving function such as that provided by inner valve sleeve 133, but when used with fuel injectors 145, such a valving function is unnecessary.

The plurality of outer sleeve ports 135 and outer housing ports 117 allow fuel to enter the detonation chamber during operation of pulse detonation engine 111. Outer sleeve ports 135 and outer housing ports 117 are arranged in eight axial groups, each group being circumferentially disposed 45 degrees apart from the adjacent groups. However, a greater or lesser number of groups could be used. Each group of the outer housing ports 117 is radially aligned with each group of inner housing ports 121 (see FIGS. 6 and 8). The radial alignment of these ports 117, 121 allows improved mixing of the liquid fuel and air as it enters the detonation chamber 125.

Outer protective sleeve 147 is adapted to oscillate along longitudinal axis 119 between an open position (see FIGS. 5 and 6) and a closed position (see FIGS. 7 and 8). In the open position, the outer sleeve ports 135 register with the outer housing ports 117, thereby exposing the fuel injectors 145 and allowing fluid communication between the fuel injectors 145 and the detonation chamber. In the closed position, the outer sleeve ports 135 no longer register with the outer housing ports 117. When the outer sleeve 147 is closed, the sleeve 147 covers the fuel injectors 145 thus protecting them during detonation.

Although it is preferable to oscillate outer protective sleeve 147 along axis 119, the sleeve 147 could be rotated about the axis 119. If the outer protective sleeve 147 was rotated, its function would remain the same as if the sleeve 147 was being oscillated.

Outer protective sleeve 147 is moved by an external drive system. The external drive system, which may or may not be the same as that used with the inner valve sleeve 133, is operably connected to a crank shaft 159. A connecting rod 161 is connected to the crank shaft 159 and converts the rotational motion of the crank shaft 159 to translational motion parallel to longitudinal axis 119. A translation rod 163 is rigidly connected at one end to the connecting rod 161 and at another end to the outer protective sleeve 147. The translation rod 163 is located outside of outer tubular housing 113. As the crank shaft 159 is rotated by the external drive system, the translation rod 163 causes the outer protective sleeve 147 to oscillate along longitudinal axis 119 between the open position and the closed position.

Detonation of the fuel mixture is performed by igniters 169, which may be either spark-type or lasers. At least two igniters 169 are disposed in the upstream end wall 127 of the detonation chamber 125. It is preferred to have at least four igniters 169 in the detonation chamber, each igniter spaced 90 degrees apart. Only two of the four igniters 169 are shown in FIGS. 5 and 7. An alternate method of detonation could be supplied by injecting a detonation wave to start the main detonation.

In operation, the movements of inner valve sleeve 133 and outer protective sleeve 147 are timed to operate synchronously with fuel injectors 145. During a normal cycle of the engine, the inner valve sleeve 133 opens, thus aligning inner sleeve ports 135 with inner housing ports 121. At the same time, the outer protective sleeve 147 opens, thus aligning outer sleeve ports 135 with outer housing ports 117. Air enters the detonation chamber 125 through inner housing ports 121 as atomized liquid fuel is delivered by the fuel injectors 145 through outer housing ports 117. As the air and fuel enter the detonation chamber 125, the fuel mixture is formed.

Inner valve sleeve 133 then closes so that inner sleeve ports 135 and inner housing ports 121 no longer align. At the same time, the outer protective sleeve 147 moves along axis 119 into the closed position, thereby covering the fuel injectors 145. The fuel mixture is detonated by igniters 169. As the fuel mixture detonates, a detonation wave is formed that moves at approximately five to seven thousand feet per second relative to the stationary reactants in front of the wave. The detonation wave is a high temperature, high pressure, detonation wave which discharges out open downstream end 129, creating thrust. A reverberating expansion wave is created by the initial detonation wave. The expansion wave reflects off the upstream end wall 127 and discharges from the open downstream end 129, creating additional thrust. The closure of inner valve sleeve 133 and outer protective sleeve 147 prevents hot products and hot metal from coming into contact with fuel or oxygen that has not yet been introduced into the detonation chamber 125.

After detonation, the inner valve sleeve 133 moves again into the open position. During this portion of the cycle, however, no fuel is injected. Instead, ram air is allowed to flow through the inner housing ports 121 into the detonation chamber 125. The ram air purges the detonation chamber 125 of any hot products and dilutes any trapped reactants. Immediately after purging, the inner valve sleeve 133 closes, and then the entire cycle is repeated. The rotational speed of inner valve sleeve 133, the translational speed of outer protective sleeve 147, and the injection rate of fuel 1 injectors 145 are selected to create pulses at a rate of approximately 100 cycles per second.

Figure 9:
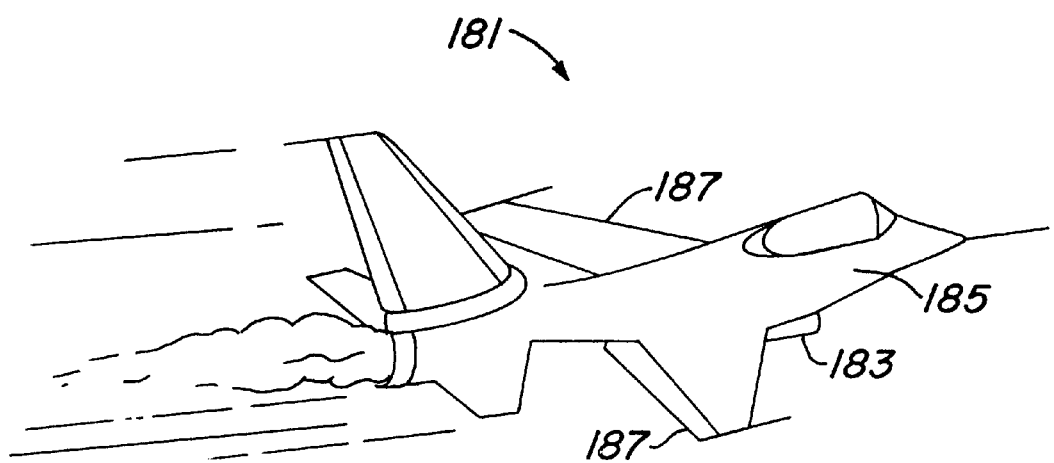
FIG. 9 illustrates a military airplane powered by the pulse detonation engines of either FIG. 1 or FIG. 5.

FIG. 9 illustrates a military airplane 181 that has pulse detonation engines 183 as shown in FIGS. 1–8. Airplane 181 has a fuselage 185 and wings 187.

The present invention provides all of the advantages normally associated with pulse detonation engines coupled with the capability of using liquid fuel. Pulse detonation engines are generally capable of providing increased thrust when compared to conventional gas turbine engines. However, gaseous fuel is usually considered the primary fuel source for most pulse detonation engines. By providing fuel injectors and a protective sleeve to protect the fuel injectors during detonation, liquid fuel can be successfully utilized with the pulse detonation engine of the present invention. This is highly significant since typical aircraft use liquid fuel and have extensive infrastructure to support the use of liquid fuel. The use of liquid fuel with a pulse detonation engine allows the engine to be easily incorporated into existing aircraft designs.

It should be apparent from the foregoing that an invention having significant advantages has been provided. While the invention is shown in only a few of its forms, it is not just limited but is susceptible to various changes and modifications without departing from the spirit thereof.

We claim:

1. An aircraft having wings and a fuselage comprising:
   a pulse detonation engine mounted to the aircraft comprising:
   an outer tubular housing having a cylindrical bore and at least one outer housing port;
   an inner tubular housing having a cylindrical bore and at least one inner housing port;
   an outer sleeve movably carried by the outer tubular housing for movement relative to the outer tubular housing, the outer sleeve having at least one outer sleeve port, the outer sleeve port having an open position aligning with the outer housing port to open the outer housing port and a closed position blocking the outer housing port;
   an inner sleeve movably carried by the inner tubular housing for movement relative to the inner tubular housing, the inner sleeve having at least one inner sleeve port, the inner sleeve port having an open position aligning with the inner housing port to open the inner housing port and a closed position blocking the inner housing port;
   a fuel injection system for atomizing and injecting liquid fuel from a liquid fuel source to the pulse detonation engine, the fuel injection system having a fuel injector alternately located adjacent one of the outer tubular housing port and the inner tubular housing port and the other of the outer and inner tubular housing ports adapted to receive a gas containing oxygen;
   a detonation chamber located within an annulus formed between the outer tubular housing and the inner tubular housing, the detonation chamber receiving the atomized liquid fuel from the injector and a gas containing oxygen when the outer and inner housing ports are open, the liquid fuel and gas creating a fuel mixture; and an igniter mounted to the detonation chamber for detonating the fuel mixture to create a detonation wave while the outer and inner housing ports are closed.

2. The aircraft according to claim 1 wherein:

the outer sleeve of the pulse detonation engine is rotatably carried on the outer tubular housing; and the outer sleeve port aligns with the outer housing port at least once per revolution to open the outer housing port.

3. The aircraft according to claim 1 wherein:

the inner sleeve is cyclically translated in a linear oscillating motion along the inner tubular housing; and the inner sleeve port aligns with the inner housing port at least once per cycle to open the inner housing port.

4. The aircraft according to claim 1 wherein:

the outer sleeve of the of the pulse detonation engine is rotatably carried on an exterior of the outer tubular housing;

the outer sleeve port aligns with the outer housing port at least once per revolution to open the outer housing port for allowing gas to enter the detonation chamber;

the inner sleeve is cyclically translated in a linear oscillating motion along an exterior of the inner tubular housing; and the inner sleeve port aligns with the inner housing port at least once per cycle to open the inner housing port for allowing atomized liquid fuel to enter the detonation chamber, the inner housing port being open when the outer housing port is open.

5. The aircraft according to claim 1 wherein:

the inner sleeve of the of the pulse detonation engine is rotatably carried on the inner tubular housing; and the inner sleeve port aligns with the inner housing port at least once per revolution to open the inner housing port.

6. The aircraft according to claim 1 wherein:

the outer sleeve of the pulse detonation engine is cyclically translated in a linear oscillating motion along the outer tubular housing; and the outer sleeve port aligns with the outer housing port at least once per cycle to open the outer housing port.

7. The aircraft according to claim 1 wherein:

the inner sleeve of the pulse detonation engine is rotatably carried on an interior of the inner tubular housing;

the inner sleeve port aligns with the inner housing port at least once per revolution to open the inner housing port for allowing gas to enter the detonation chamber;

the outer sleeve is cyclically translated in a linear oscillating motion along an interior of the outer tubular housing; and the outer sleeve port aligns with the outer housing port at least once per cycle to open the outer housing port for allowing atomized liquid fuel to enter the detonation chamber, the outer housing port being open when the inner housing port is open.

8. The aircraft according to claim 1 wherein the fuel injector is mounted to the inner tubular housing adjacent the inner housing port.

9. The aircraft according to claim 1 wherein the fuel injector is mounted to the outer tubular housing adjacent the outer housing port.

10. A pulse detonation apparatus comprising:

an outer tubular housing having an exterior, a cylindrical bore, and a plurality of outer housing ports;

an inner tubular housing having an exterior, a cylindrical bore, and a plurality of inner housing ports, the inner tubular housing disposed concentrically within the cylindrical bore of the outer tubular housing and rigidly connected to the outer tubular housing;

an outer valve sleeve concentrically mounted on the outer tubular housing, the outer valve sleeve being moveable relative to the outer tubular housing;

the outer valve sleeve having a plurality of outer sleeve ports having an open position for registering with the outer housing ports to open the outer housing ports and a closed position to close the outer housing ports;

an inner protective sleeve concentrically mounted on the inner tubular housing, the inner protective sleeve being moveable relative to the inner tubular housing;

the inner protective sleeve having a plurality of inner sleeve ports having an open position for registering with the inner housing ports to open the inner housing ports and a closed position to close the inner housing ports;

a valve sleeve driver for moving the outer valve sleeve relative to the outer tubular housing between the open and closed positions;

a protective sleeve driver for moving the inner protective sleeve relative to the inner tubular housing;

a detonation chamber located within an annulus formed between the outer tubular housing and the inner tubular housing, the detonation chamber having an upstream end wall and an open downstream end;

a fuel injector for injecting atomized liquid fuel into the detonation chamber, the fuel injector alternately located adjacent one of the outer housing ports and the inner housing ports, the other of the outer and inner housing ports adapted to receive a gas containing oxygen, the liquid fuel combining with the gas to create a fuel mixture; and an igniter mounted to the detonation chamber for detonating the fuel mixture when the outer sleeve port and the inner sleeve port are closed to create a detonation wave for passing out the open downstream end of the detonation chamber.

11. The pulse detonation apparatus according to claim 10 wherein:

the driver for the outer valve sleeve includes a gear for rotating the outer valve sleeve relative to the outer tubular housing; and the driver for the inner protective sleeve includes a crank shaft and a connecting rod for translating the inner protective sleeve in a linear oscillatory motion.

12. The pulse detonation apparatus according to claim 10 wherein:

the outer valve sleeve is rotatably carried on the exterior of the outer tubular housing; and the outer sleeve ports align with the outer housing ports at least once per revolution to open the outer housing ports.

13. The pulse detonation apparatus according to claim 10 wherein:

the protective sleeve driver cyclically translates the inner protective sleeve in a linear oscillating motion along the exterior of the inner tubular housing; and the inner sleeve ports align with the inner housing ports at least once per cycle to open the inner housing ports.

14. The pulse detonation apparatus according to claim 10 wherein:

the outer valve sleeve is rotatably carried on the outer tubular housing;

the outer sleeve port aligns with the outer housing port at least once per revolution to open the outer housing port;

the inner protective sleeve is cyclically translated in a linear oscillating motion along the inner tubular housing; and the inner sleeve port aligns with the inner housing port at least once per cycle to open the inner housing port, the inner housing port being open when the outer housing port is open.

15. The pulse detonation apparatus according to claim 10 wherein the fuel injector is mounted to the inner tubular housing adjacent the inner housing port.

16. The pulse detonation apparatus according to claim 10 wherein the fuel injector is mounted to the outer tubular housing adjacent the outer housing port.

17. The pulse detonation apparatus according to claim 10 wherein:

the inner protective sleeve of the pulse detonation engine is rotatably carried on an interior of the inner tubular housing;

the inner protective sleeve port aligns with the inner housing port at least once per revolution to open the inner housing port for allowing gas to enter the detonation chamber;

the outer valve sleeve is cyclically translated in a linear oscillating motion along an interior of the outer tubular housing; and the outer sleeve port aligns with the outer housing port at least once per cycle to open the outer housing port for allowing atomized liquid fuel to enter the detonation chamber, the outer housing port being open when the inner housing port is open.

18. A method for producing a pulse detonation wave comprising:

(a) providing an engine having an outer tubular housing, an inner tubular housing, an outer sleeve, and an inner sleeve, the outer tubular housing having at least one outer housing port, the inner tubular housing having at least one inner housing port, the outer sleeve having at least one outer sleeve port, the inner sleeve having at least one inner sleeve port;

(b) moving the outer sleeve relative to the outer tubular housing such that the outer sleeve port registers with the outer housing port at selected times to open the outer housing port and blocks the outer housing port at other times to close the outer housing port;

(c) moving the inner sleeve relative to the inner tubular housing such that the inner sleeve port registers with the inner housing port at selected times to open the inner housing port and blocks the inner housing port at other times to close the inner housing port;

(d) injecting atomized liquid fuel through one of the housing ports into the detonation chamber and a gas containing oxygen through the other housing port to form a fuel mixture when the outer housing port and the inner housing port are open; and (e) igniting the fuel mixture to create the pulse detonation wave while the housing ports are closed.

19. The method according to claim 18 wherein steps (b) and (c) further comprise:

rotating the outer sleeve relative to the outer tubular housing such that the outer sleeve port registers with the outer housing port at least once per revolution; and translating the inner sleeve in a linear oscillatory motion relative to the inner tubular housing such that the inner sleeve port registers with the inner housing port at least once during every oscillatory cycle.

20. The method according to claim 18 wherein steps (b) and (c) further comprise:

rotating the inner sleeve relative to the inner tubular housing such that the inner sleeve port registers with the inner housing port at least once per revolution; and translating the outer sleeve in a linear oscillatory motion relative to the outer tubular housing such that the outer sleeve port registers with the outer housing port at least once during every oscillatory cycle.

\* \* \* \* \*